(12) United States Patent
Zheng et al.

(10) Patent No.: US 9,374,118 B2
(45) Date of Patent: Jun. 21, 2016

(54) DRAWER-TYPE SIM CARD STRUCTURE AND ELECTRONIC PRODUCT

(71) Applicant: ZTE CORPORATION, Shenzhen, Guangdong Province (CN)

(72) Inventors: Shize Zheng, Shenzhen (CN); Yong Sun, Shenzhen (CN)

(73) Assignee: ZTE Corporation (CN)

( * ) Notice: Subject to any disclaimer, the term of this patent is extended or adjusted under 35 U.S.C. 154(b) by 0 days.

(21) Appl. No.: 14/426,644

(22) PCT Filed: Jun. 28, 2013

(86) PCT No.: PCT/CN2013/078452
§ 371 (c)(1),
(2) Date: Mar. 6, 2015

(87) PCT Pub. No.: WO2013/178125
PCT Pub. Date: Dec. 5, 2013

(65) Prior Publication Data
US 2015/0303963 A1    Oct. 22, 2015

(30) Foreign Application Priority Data

Sep. 5, 2012    (CN) .......................... 2012 1 0325240

(51) Int. Cl.
*H04B 1/3816*    (2015.01)
*H04M 1/02*    (2006.01)

(52) U.S. Cl.
CPC .............. *H04B 1/3816* (2013.01); *H04M 1/02* (2013.01)

(58) Field of Classification Search
CPC .................................................. H04B 1/3816

USPC ..................... 455/558, 550.1, 575.1
See application file for complete search history.

(56) References Cited

U.S. PATENT DOCUMENTS 6,304,454 B1 * 10/2001 Akamatsu et al. ............ 361/752
2009/0035977 A1    2/2009 Chen et al.

FOREIGN PATENT DOCUMENTS

| CN | 1295694 A | 5/2001 |
|---|---|---|
| CN | 2572687 Y | 9/2003 |
| CN | 201698457 U | 1/2011 |
| CN | 102868784 A | 1/2013 |
| EP | 1074936 A1 | 2/2001 |

OTHER PUBLICATIONS

The extended European search report dated Jul. 29, 2015 in EP application No. 13796509.1.

* cited by examiner

*Primary Examiner* — Tuan H Nguyen
(74) *Attorney, Agent, or Firm* — Plumsea Law Group, LLC

(57) ABSTRACT

A drawer-type SIM card structure and an electronic product is provided, and the drawer-type SIM card structure is mounted in the interior of a containing cavity of a housing of an electronic product, including: a containing means for carrying a subscriber identification module (SIM) card, which can be relatively slidably mounted in the interior of the containing cavity; a connector which is fixedly mounted in the interior of the containing cavity and configured to be in a fit connection with the SIM card within the containing means; and a sensor which is fixedly mounted in the interior of the containing cavity, electrically connected with the connector, and configured to control the connection and disconnection of the connector and SIM card according to the position of the containing means.

18 Claims, 4 Drawing Sheets

DRAWER-TYPE SIM CARD STRUCTURE AND ELECTRONIC PRODUCT

CROSS-REFERENCE TO RELATED APPLICATION(S)

This application is the U.S. National Phase application of PCT application number PCT/CN2013/078452 having a PCT filing date of Jun. 28, 2013, which claims priority of Chinese patent application 201210325240.X filed on Sep. 5, 2012, the disclosures of which are hereby incorporated by reference.

TECHNICAL FIELD

The present document relates to a device specifically applicable to a wireless communication network, and more particularly, to a drawer-type SIM card structure and an electronic product.

BACKGROUND OF THE RELATED ART

With the rapid development of mobile communications industry, the mobile phone has become an indispensable tool in daily work and life of more and more consumers, and the subscriber identification module card (SIM) of a mobile phone is a plastic card loaded with an IC chip and it has functions such as recording individual user numbers and address book, and one mobile phone can be used by multiple users by replacing the SIM card.

Typical SIM card structures comprise fixed-type, flip-type and self-lock-type.

A user who uses the fixed-type SIM card structure needs to use a finger push in and pull out the SIM card, and the mobile phone itself has no fixing structure for SIM card, and a surrounding structure is needed to restrict and fix the position of the SIM card. A mobile phone with the flip-type SIM card structure must remain space for flipping above the SIM card, which has certain restrictions on the layout, location and structure. The self-lock-type SIM card structure is relatively convenient to be used but it has high cost. The drawer-type SIM card structure combines advantages of the fixed-type and the self-lock-type, thus it is widely used.

A conventional drawer-type SIM card structure typically comprise one containing means, relatively slidably mounted in the interior of a housing for carrying a SIM card, the SIM card is electrically connected to a connector in the containing means, and when the containing means slides out from the interior of the housing, the SIM card is disconnected from the connector, and in this process, the connector may not be fully powered off and be still working, at this moment the information in the SIM card can be destroyed due to a sudden disconnection of the SIM card from the connector; meanwhile the abovementioned drawer-type SIM card structure is relatively complex, and it is relatively inconvenient for a user to use.

SUMMARY OF THE INVENTION

The objective of the embodiment of the present invention is to provide a drawer-type SIM card structure which has a simple structure and is easy to use and can effectively protect information in a SIM card from being destroyed due to taking out the card, as well as an electronic product.

The drawer-type SIM card structure in accordance with the embodiment of the present invention is mounted in the interior of a containing cavity of a housing of an electronic product, comprising:

a containing means for carrying a SIM card, relatively slidably mounted in the interior of the containing cavity;

a connector, fixedly mounted in the interior of the containing cavity and configured to be in a fit connection with the SIM card within the containing means;

a sensor, fixedly mounted in the interior of the containing cavity, electrically connected to the connector, and configured to control the connection and disconnection of the connector and SIM card according to the position of the containing means.

The drawer-type SIM card structure in accordance with the embodiment of the present invention further comprises an opening means for driving the containing means to slide out of the containing cavity, and the opening means is mounted on the housing and is located at an opening of the containing cavity, and can move relative to the housing, and the opening means is in an interference fit with the sensor, such that the sensor control the connector to connect with the SIM card when the opening means is in a closed state, and the opening means detaches from the sensor when driving the containing means to move, such that the sensor control the connector to disconnect from the SIM card.

In the drawer-type SIM card structure in accordance with the embodiment of the present invention, the containing means is provided with a projection, the opening means comprises a seat body relatively rotatably mounted on the housing and a toggling block retractably mounted on the seat body, the toggling block mates with the projection to form a spring-locking structure, so that the seat body can drive the containing means to slide out from the interior of the containing cavity in a rotation process, and the seat body is in an interference fit with the sensor, such that the sensor control the connector to connect with the SIM card when the opening means is in the closed state, and the seat body detaches from the sensor in the rotation process, so that the sensor controls the connector to disconnect from the SIM card.

In the drawer-type SIM card structure in accordance with the embodiment of the present invention, the side surface of the seat body which faces the projection is provided with a mounting groove vertically extending to the interior of the seat body, and the toggling block is retractably mounted in the interior of the mounting groove, and a spring is provided between the bottom wall of the mounting groove and the toggling block to apply a pressure on the toggling block to make the toggling block extend from the interior of the mounting groove.

In the drawer-type SIM card structure in accordance with the embodiment of the present invention, the seat body is located at the opening of the containing cavity, and a flashboard is connected to the side surface of the seat body to drive the seat body to rotate, and the flashboard extends from one end to the other end of the opening of the containing cavity, so as to seal the containing cavity after the containing means slides into the containing cavity.

In the drawer-type SIM card structure in accordance with the embodiment of the present invention, the seat body is provided with a through-hole which extends from the top surface to the bottom surface, an upper axle and a lower axle are respectively provided in the through-hole, and the upper axle and the lower axle are respectively fixedly connected with the housing, and the seat body is rotatably mounted on the housing via the upper axle and the lower axle.

In the drawer-type SIM card structure in accordance with the embodiment of the present invention, a clamping engagement structure is provided between the containing means and the containing cavity to fix the containing means in the interior of the containing cavity.

In the drawer-type SIM card structure in accordance with the embodiment of the present invention, a triangular projection portion is respectively provided on both sides of the containing means, and both inner walls of cavity of the containing cavity are respectively provided with a groove mating with the projection portion, and the projection portion mates with the groove to form the clamping engagement structure.

An electronic product in accordance with an embodiment of the present invention comprises a housing, and the housing is provided with a containing cavity, and the abovementioned drawer-type SIM card structure is mounted in the interior of the containing cavity.

In the drawer-type SIM card structure in accordance with the embodiment of the present invention, a sensor controls the connection and disconnection of a connector and a SIM card according to the position of the containing means, to avoid the information in the SIM card from being destroyed due to a sudden disconnection of the SIM card from the connector; and the abovementioned drawer-type SIM card structure has a simple structure and it is easy for a user to use. The drawer-type SIM card structure in the present document avoids the inconvenience of using a specific tool to open, and it can mate with a containing means without self-detection design and makes the layout of an electronic product more flexible.

Because the electronic product in accordance with the embodiment of the present invention uses the drawer-type SIM card structure in accordance with the embodiment of the present invention, the operation is safer and more convenient, and its layout is more flexible.

BRIEF DESCRIPTION OF THE DRAWINGS

The FIG. 1 is a structural diagram of an electronic product in accordance with an embodiment of the present invention.

PREFERRED EMBODIMENTS OF THE INVENTION

Figure 1:
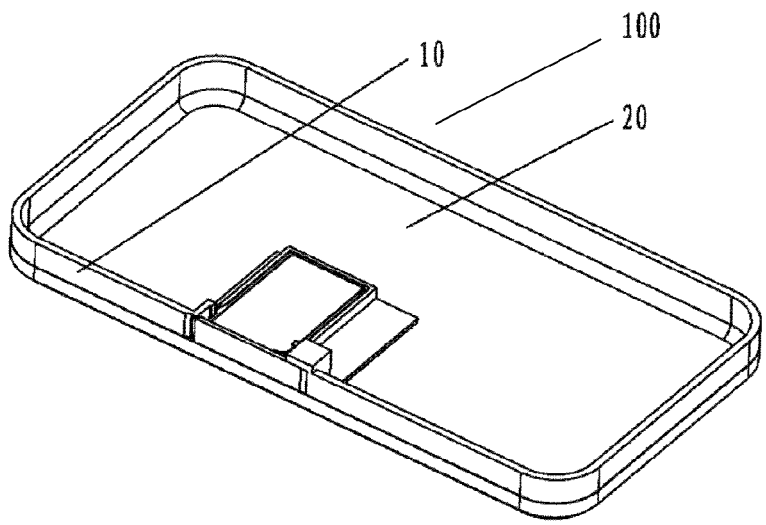
Figure 2:
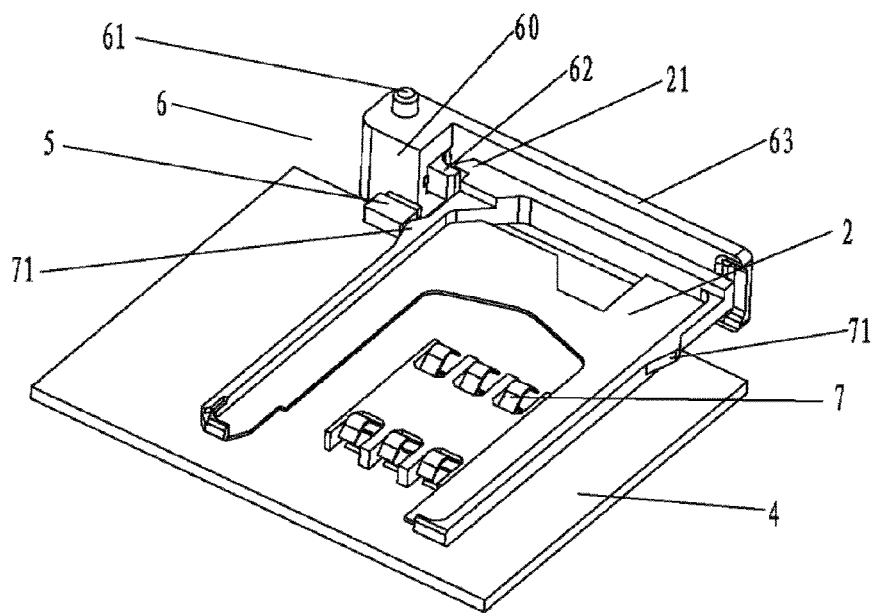
FIG. 2 is a structural diagram of a drawer-type SIM card structure in accordance with an embodiment of the present invention.

As shown in FIG. 1 and FIG. 2, an electronic product 100 in accordance with an embodiment of the present invention comprises a housing 10. The housing 10 is provided with the containing cavity 20. A drawer-type SIM card structure in accordance with an embodiment of the present invention is mounted in the interior of the containing cavity 20. The PCB board 4 is also set in the interior of the housing 10.

Figure 4:
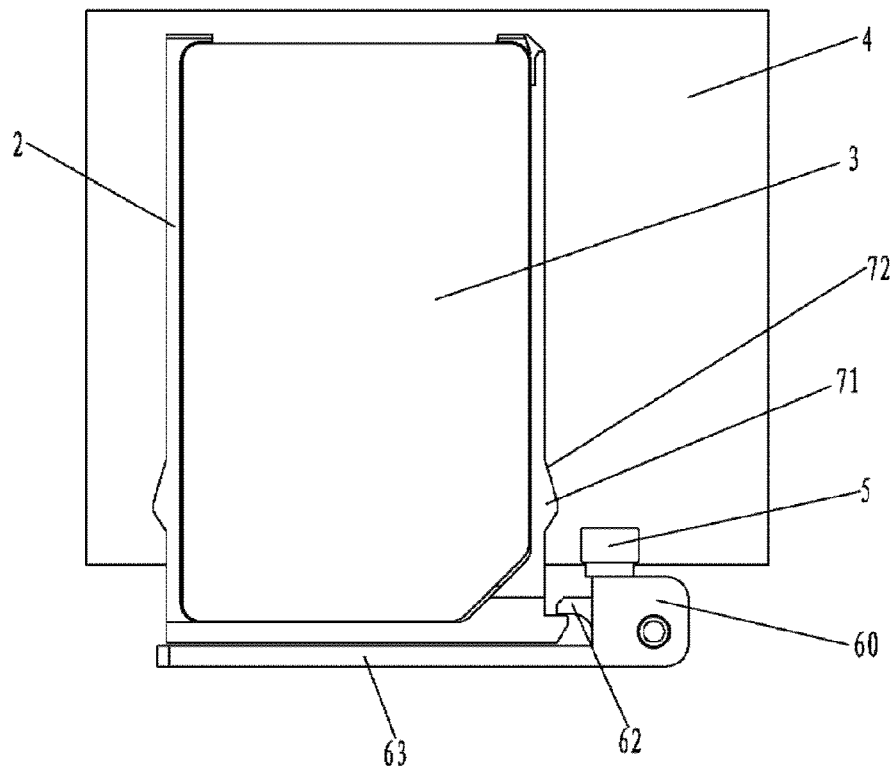
FIG. 4 is a structural diagram of a drawer-type SIM card being in a closed state in accordance with an embodiment of the present invention.

Combining with what is shown in FIG. 4, the drawer-type SIM card structure in accordance with an embodiment of the present invention is mounted in the interior of the containing cavity 20 of the housing 10 of the electronic product 100, and the drawer-type SIM card structure in accordance with the embodiment of the present invention comprises:

a containing means 2 for carrying a SIM card, which is relatively slidably mounted in the interior of the containing cavity 20;

a connector 7, fixedly mounted in the interior of the containing cavity 20 and configured to be in a fit connection with SIM card 3 within the containing means 2;

a sensor 5, fixedly mounted in the interior of the containing cavity 20, electrically connected to the connector 7, and configured to control the connection and disconnection of the connector 7 and SIM card 3 according to the position of the containing means 2.

In the drawer-type SIM card structure in accordance with the embodiment of the present invention, the sensor 5 controls the connection (i.e., control the connector 7 to provide the power supply for the SIM card 3) and disconnection (i.e., control the connector 7 to no long provided the power supply for the SIM card 3) of the connector 7 and the SIM card 3 according to the position of the containing means 2, to avoid the information in the SIM card from being destroyed due to a sudden disconnection of the SIM card from the connector; and the abovementioned drawer-type SIM card structure is simple and is relatively convenient for a user to use.

The drawer-type SIM card structure in accordance with the embodiment of the present invention avoids the inconvenience of using a specific tool to open, and it is able to mate with a containing means without self-detection design and makes the layout of an electronic product more flexible.

In the drawer-type SIM card structure in accordance with the embodiment of the present invention, the connector 7 is provided on the PCB 4, and when the containing means 2 is located in the interior of the containing cavity 20, it is exactly above the connector 7. The bottom wall of the containing means 2 has an opening, and when the SIM card 3 is located in the interior of the containing means 2, the SIM card 3 is closely attached and electrically connected to the connector 7.

Figure 3:
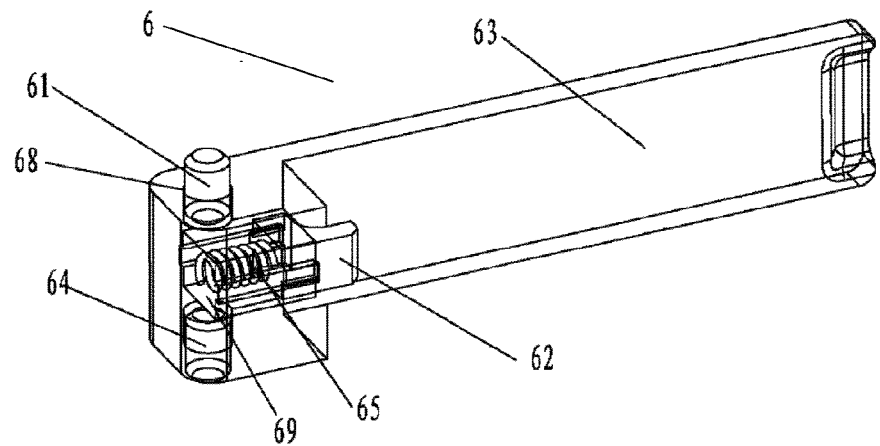
FIG. 3 is a structural diagram of an opening means.

Combining with what is shown in FIG. 3, the drawer-type SIM card structure in accordance with the embodiment of the present invention further comprises an opening means 6 for driving the containing means 2 to slide in or out of the interior of the containing cavity 20. The opening means 6 is mounted on the housing 10 and is located at the opening of the containing cavity 20, and it can move relative to the housing 10. The opening means 6 is in an interference fit with the sensor 5, so that the sensor 5 controls the connector 7 to connect with the SIM card 3, and the opening means 6 detaches from the sensor 5 when driving the containing means 2 to move, so that the sensor 5 controls the connector 7 to disconnect from the SIM card 3.

In the drawer-type SIM card structure in accordance with the embodiment of the present invention, the containing means 2 is provided with the projection 21, and the opening means 6 comprises a seat body 60 relatively rotatably mounted on the housing and a toggling block 62 retractably mounted on the seat body 60, and the seat body 60 is located on one side of the opening of the containing cavity 20, the toggling block 62 faces toward the opening of the containing cavity 20 and corresponds to the position of the projection 21, forming a spring-locking structure. In the closed state of the drawer-type SIM card structure, the toggling block 62 extends to the inner side of the projection 21. In the opening process, the toggling block 62 mates with the projection 21, and the toggling block 62 is not retractable, so that the seat body 60 drives the containing means 2 slide out from the interior of the containing cavity 20 during a rotation process, and in the closing process of drawer-type SIM card structure, firstly the containing means 2 is in a clamping engagement with the containing cavity 20, and then the opening means 6 is closed, the toggling block 62 is retractable when being in contact with the projection 21, so as to return to the closed state. The seat body 60 is in an interference fit with the sensor 5, such that the sensor 5 control the connection of the connector 7 and SIM card 3, and the seat body 60 detaches from the sensor 5 during the rotation process, so that the sensor 5 controls the connector 7 to disconnect from the SIM card 3.

In the drawer-type SIM card structure in accordance with the embodiment of the present invention, the side surface of the seat body 60 facing the projection 21 is provided with the mounting groove 69 which vertically extends to the interior of the seat body 60. The toggling block 61 is retractably mounted in the interior of the mounting groove 69. Spring 65 is provided between the bottom wall of the mounting groove 69 and the toggling block 62 for applying a pressure on the toggling block 62 so that the toggling block 62 extends out from the interior of the mounting groove 69.

In the drawer-type SIM card structure in accordance with an embodiment of the present invention, the seat body 60 is located at the opening of the containing cavity 20, and the flashboard 63 is connected to the side surface of the seat body 60 for driving the seat body 60 to rotate. The flashboard 63 extends from one end to the other end of the opening of the containing cavity 20, so as to seal the containing cavity 20 after the containing means 2 slides into the containing cavity 20.

In the drawer-type SIM card structure in accordance with an embodiment of the present invention, the seat body 60 is axially connected with the housing 10, and the seat body 60 is provided with the through-hole 68 extending from the top surface to the bottom surface. The upper axle 61 and lower axle 64 are respectively provided within the through-hole 68. The upper axle 61 and the lower axle 64 are respectively fixedly connected with the housing 10, and the seat body 60 is rotatably mounted on the housing 10 through the upper axle 61 and the lower axle 64.

In the drawer-type SIM card structure in accordance with an embodiment of the present invention, a clamping engagement structure is provided between the containing means 2 and the containing cavity 20, and triangular projection portion 71 is respectively provided on both sides of the containing means 2. The groove 72 which mates with the projection portion 71 is respectively provided on both inner walls of cavity of the containing cavity 20. Via the mating of the projection portion 71 and the groove 72, the containing means 2 is fixed to the interior of the containing cavity 20, and both inner walls of cavity of the containing cavity 20 are elastic walls.

Figure 5:
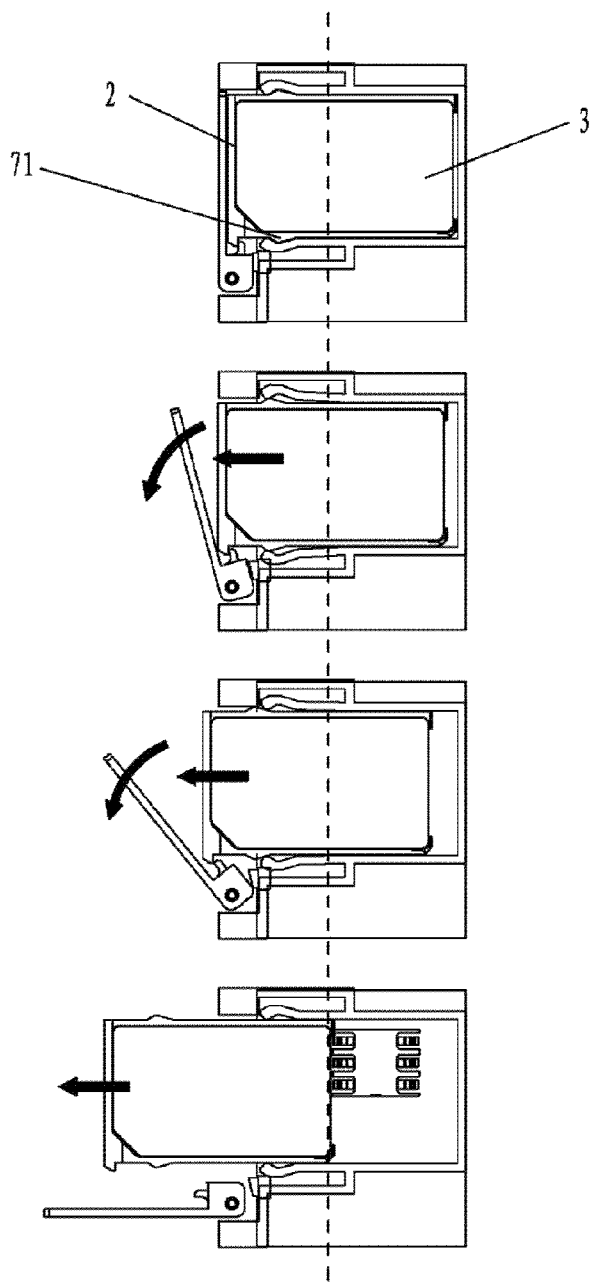
FIG. 5 is a schematic diagram of process of opening a drawer-type SIM card structure in an electronic product in accordance with an embodiment of the present invention, and from top to bottom, it shows a process of a containing means sliding out of the interior of a containing cavity of an electronic product.

Combining with what is shown in FIG. 5, in the closed state of the drawer-type SIM card structure, the opening means 6 uses a rotational self-locking force provided by the upper axle 61 and the lower axle 64 to provide an inwardly closing force for the flashboard 63, and in the closed state, the seat body 60 will press and trigger the sensor 5, and the sensor 5 controls the connector 7 to connect with the SIM card 3 in the triggering state.

A user can use his/her finger to shift the finger-pulling area on the side of the flashboard 63 of the opening means 6, and the finger provides an outward force to make the flashboard 63 drive the seat body 60 to perform an outward rotation movement by taking the upper axle 61 and the axle 64 as the axis, and the finger continues to provide the force and deliver the force to the containing means 2 via the toggling block 62, and the toggling block 62 mates with the projection 21, and the projection 71 detaches from the groove 72, and the containing means 2 slides out from the interior of the containing cavity 20, and the seat body 60 detaches from the sensor 5 in the rotation process, such that the sensor 5 control the connector 7 to disconnect from the SIM card 3, so that the user can safely pull out the card.

Figure 6:
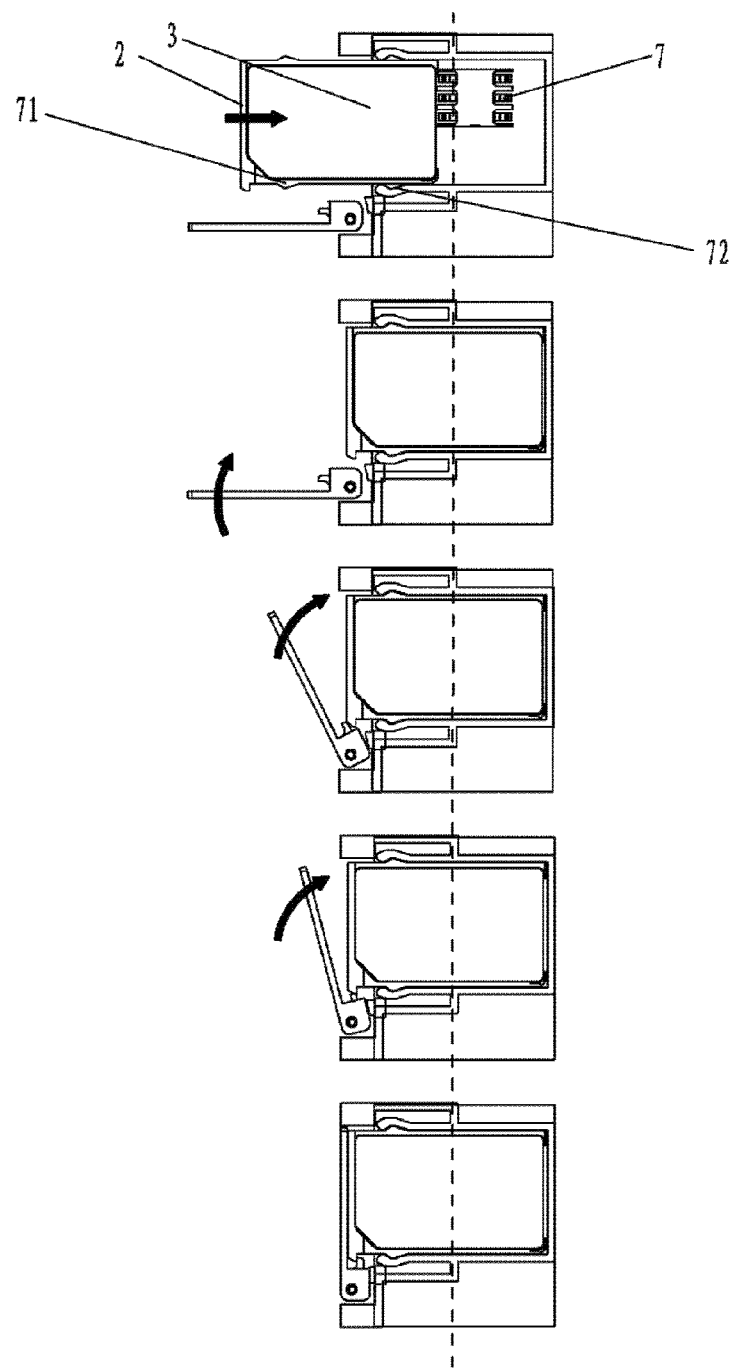
FIG. 6 is a schematic diagram of process of closing a drawer-type SIM card structure in an electronic product in accordance with an embodiment of the present invention, and from top to bottom, it shows a process of a containing means sliding from the outside of a containing cavity into the containing cavity.

Combining with what is shown in FIG. 6, after the user places the SIM card 3 into the containing means 2, the user pushes the containing means 2 to the interior of the containing cavity 20 until the projection 71 mates with the groove 72, and the containing means 2 is fixed to the interior of the containing cavity 20. The user uses his finger to inwardly shift the flashboard 63, and the flashboard 63 rotates inwardly by taking the upper axle 61 and the lower axle 64 as the center of a circle and drives the seat body 60, and when the seat body 60 is rotating, the toggling block 62 interferes with the projection 21 and then retracts back into the mounting groove 69, and the seat body 60 continues to rotate, and after the toggling block 62 is away from the interfering position, the toggling block 62 automatically pops up under the action of the spring 65 and it is located in the inner side of the projection 21. At this time, the seat body 60 is in an interference fit with the sensor 5, that is the seat body 60 presses and triggers the sensor 5, and the sensor 5 controls the connector 7 to connect with the SIM card 3. The connector 7 performs an interpretation program on the SIM card 3.

In the drawer-type SIM card structure in accordance with an embodiment of the present invention, a detecting element can be triggered when the flashboard rotates, and the detecting element provides a connector power supply cut-off signal, avoiding the card from being burned due to a short circuit when the user takes out the card, it only needs to insert the containing means and rotatably reset the flashboard in the assembly, and the connector can perform the interpretation program on the SIM card.

In summary, the operations of opening and closing the drawer-type SIM card structure in accordance with the embodiment of the present invention are very convenient.

The drawer-type SIM card structure in accordance with the embodiment of the present invention utilizes a novel composition structure, which is convenient for a user to use, and its modeling and layout have a high degree of freedom and cover features such as hot-plug-in-plug-out detection function, thereby improving the convenience of SIM card pullout and replacement.

The drawer-type SIM card structure in accordance with the embodiment of the present invention only needs to gently rotate the flashboard to bring the containing means out and power off the connector when taking out the card, thereby ensuring the integrity of data in the SIM card, and achieving the purpose of securely pulling out the SIM card and taking into account the effect of appearance within the limited internal space of the electric product.

The above description is only preferred embodiments of the present invention, and it should be noted that for those of ordinary skill in the art, many improvements and modifications may be made on the premise of without departing from the principle of the patent document, and these improvements and modifications should also be considered to be included within the protection scope of the patent document.

INDUSTRIAL APPLICABILITY

In the drawer-type SIM card structure in accordance with an embodiment of the present invention, a sensor controls the connection and disconnection of a connector and a SIM card according to the position of the containing means to avoid the information in the SIM card from being destroyed due to a sudden disconnection of the SIM card from the connector; the abovementioned drawer-type SIM card structure is simple and is easy for a user to use. The drawer-type SIM card structure in the present document avoids the inconvenience of using a specific tool to open, and it can mate with a containing means without self-detection design, and makes the layout of an electronic product more flexible.

Because the electronic product in accordance with an embodiment of the present invention uses the drawer-type SIM card structure in accordance with the embodiment of the present invention, the operation is safer and more convenient, and its layout is more flexible.

What is claimed is:

1. A drawer-type subscriber identification module (SIM) card structure, mounted in an interior of a containing cavity of a housing of an electronic product, comprising:
   a container for carrying a SIM card, which is relatively slidably mounted in the interior of the containing cavity;
   a connector, fixedly mounted in the interior of the containing cavity and configured to be in a fit connection with the SIM card within the container;
   a sensor, fixedly mounted in the interior of the containing cavity, electrically connected to the connector, and configured to control the connection and disconnection of the connector and SIM card according to the position of the container;
   a driver for driving the container to slide out from the interior of the containing cavity, wherein the driver is mounted on the housing and is located at an opening of the containing cavity and can move relative to the housing, wherein the driver is in an interference fit with the sensor such that the sensor controls the connector to connect with the SIM card when the driver is in a closed state, and wherein the driver detaches from the sensor when driving the container to move such that the sensor controls the connector to disconnect from the SIM card.

2. The drawer-type SIM card structure of claim 1, wherein the container is provided with a projection, and the driver comprises a seat body relatively rotatably mounted on the housing and a toggling block retractably mounted on the seat body, and the toggling block mates with the projection to form a spring-locking structure, so that the seat body can drive the container to slide out from the interior of the containing cavity in a rotation process, and the seat body is in an interference fit with the sensor, such that the sensor controls the connector to connect with the SIM card when the driver is in the closed state, and the seat body detaches from the sensor in the rotation process, so that the sensor controls the connector to disconnect from the SIM card.

3. The drawer-type SIM card structure of claim 2, wherein a side surface of the seat body which faces the projection is provided with a mounting groove vertically extending to the interior of the seat body, and the toggling block is retractably mounted in the interior of the mounting groove, and a spring is provided between a bottom wall of the mounting groove and the toggling block for applying a pressure on the toggling block so that the toggling block extends out from the interior of the mounting groove.

4. The drawer-type SIM card structure of claim 3, wherein the seat body is located at the opening of the containing cavity, and a flashboard is connected to a side surface of the seat body for driving the seat body to rotate, and the flashboard extends from one end to the other end of the opening of the containing cavity, so as to seal the containing cavity after the container slides into the containing cavity.

5. An electronic product, comprising a housing, wherein the housing is provided with a containing cavity, and the containing cavity is provided with the drawer-type SIM card structure of claim 4.

6. The drawer-type SIM card structure of claim 3, wherein the seat body is axially connected with the housing and provided with a through-hole which extends from a top surface to a bottom surface, and an upper axle and a lower axle are respectively provided in the through-hole, and the upper axle and the lower axle are respectively fixedly connected with the housing, and the seat body is rotatably mounted on the housing via the upper axle and the lower axle.

7. An electronic product, comprising a housing, wherein the housing is provided with a containing cavity, and the containing cavity is provided with the drawer-type SIM card structure of claim 6.

8. An electronic product, comprising a housing, wherein the housing is provided with a containing cavity, and the containing cavity is provided with the drawer-type SIM card structure of claim 3.

9. The drawer-type SIM card structure of claim 2, wherein the seat body is located at the opening of the containing cavity, and a flashboard is connected to a side surface of the seat body for driving the seat body to rotate, and the flashboard extends from one end to the other end of the opening of the containing cavity, so as to seal the containing cavity after the container slides into the containing cavity.

10. An electronic product, comprising a housing, wherein the housing is provided with a containing cavity, and the containing cavity is provided with the drawer-type SIM card structure of claim 9.

11. The drawer-type SIM card structure of claim 2, wherein the seat body is axially connected with the housing and provided with a through-hole which extends from a top surface to a bottom surface, and an upper axle and a lower axle are respectively provided in the through-hole, and the upper axle and the lower axle are respectively fixedly connected with the housing, and the seat body is rotatably mounted on the housing via the upper axle and the lower axle.

12. An electronic product, comprising a housing, wherein the housing is provided with a containing cavity, and the containing cavity is provided with the drawer-type SIM card structure of claim 11.

13. An electronic product, comprising a housing, wherein the housing is provided with a containing cavity, and the containing cavity is provided with the drawer-type SIM card structure of claim 2.

14. The drawer-type SIM card structure of claim 1, wherein a clamping engagement structure is provided between the container and the containing cavity to fix the container in the interior of the containing cavity.

15. The drawer-type SIM card structure of claim 14, wherein a triangular projection portion is respectively provided on both sides of the container, and both inner walls of cavity of the containing cavity are respectively provided with a groove mating with the projection portion, and the projection portion mates with the groove to form the clamping engagement structure.

16. An electronic product, comprising a housing, wherein the housing is provided with a containing cavity, and the containing cavity is provided with the drawer-type SIM card structure of claim 15.

17. An electronic product, comprising a housing, wherein the housing is provided with a containing cavity, and the containing cavity is provided with the drawer-type SIM card structure of claim 14.

18. An electronic product, comprising a housing, wherein the housing is provided with a containing cavity, and the containing cavity is provided with the drawer-type SIM card structure of claim 1.

* * * * *